July 15, 1930. J. N. KINNEY 1,770,784
ATTACHMENT FOR TRACTORS
Filed May 26, 1927 4 Sheets-Sheet 1
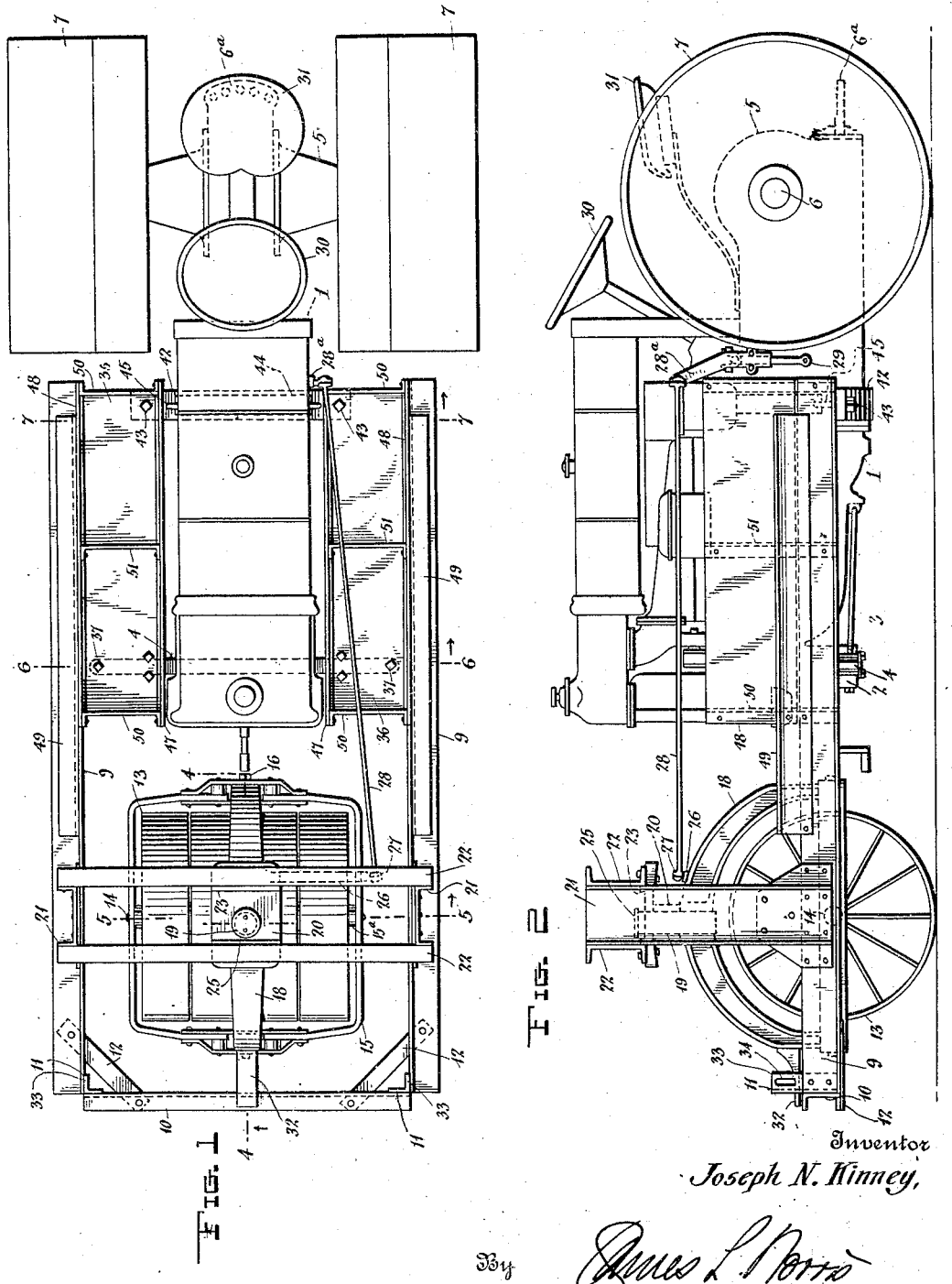

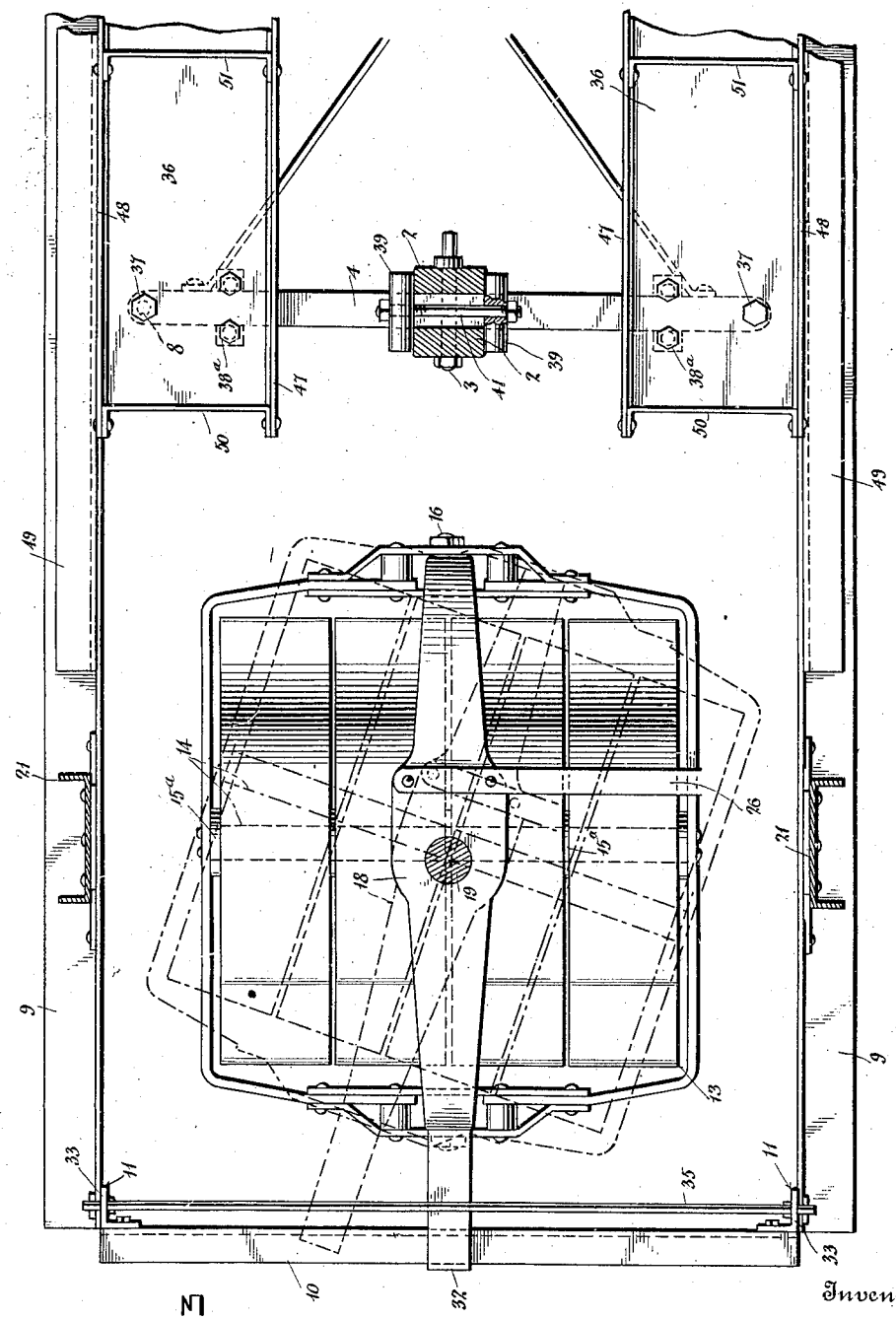

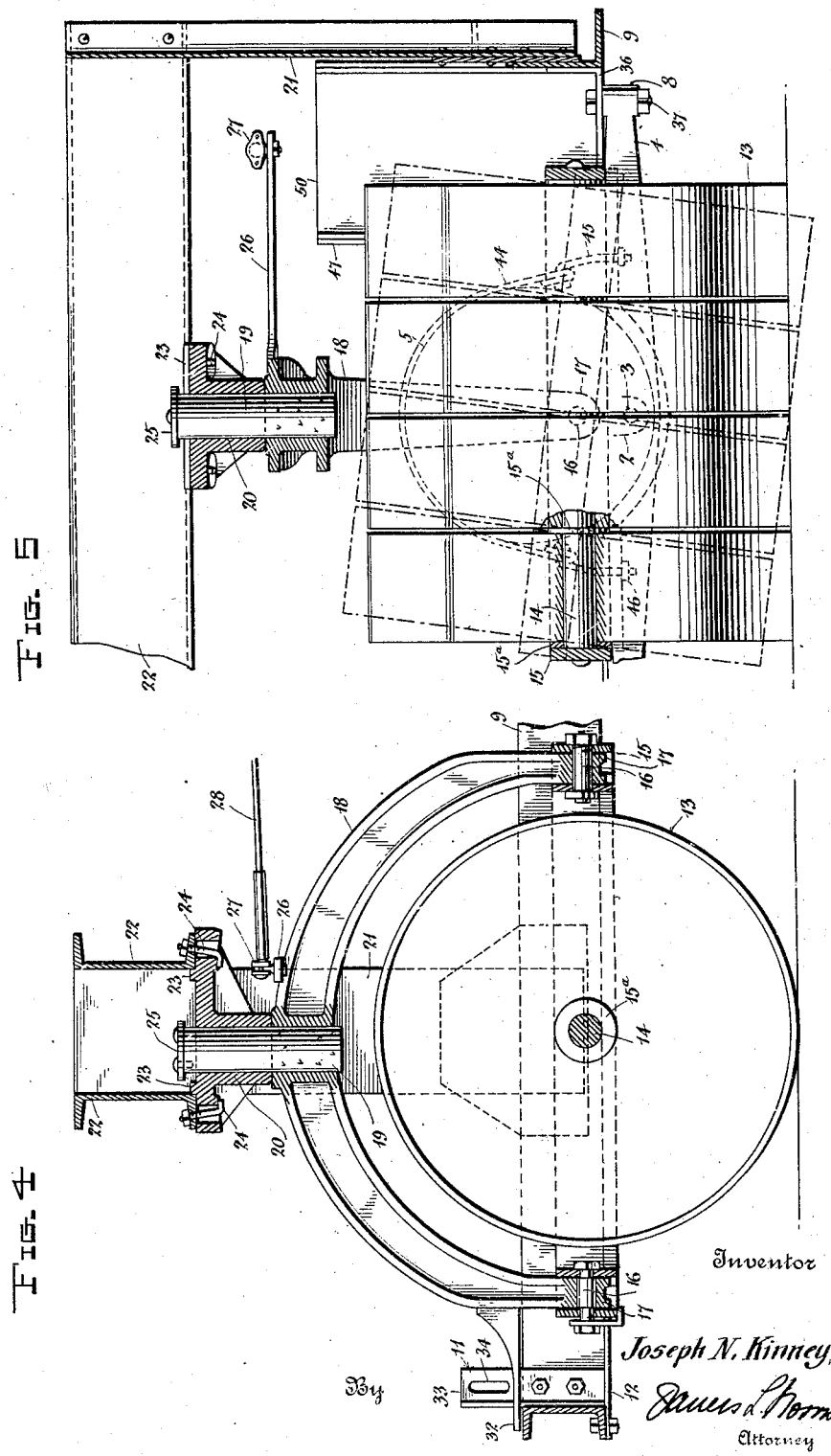

July 15, 1930.  J. N. KINNEY  1,770,784
ATTACHMENT FOR TRACTORS
Filed May 26, 1927  4 Sheets-Sheet 4
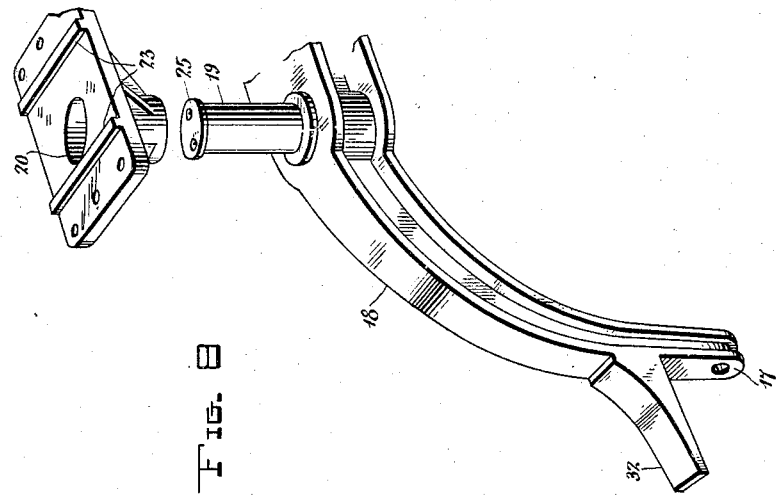
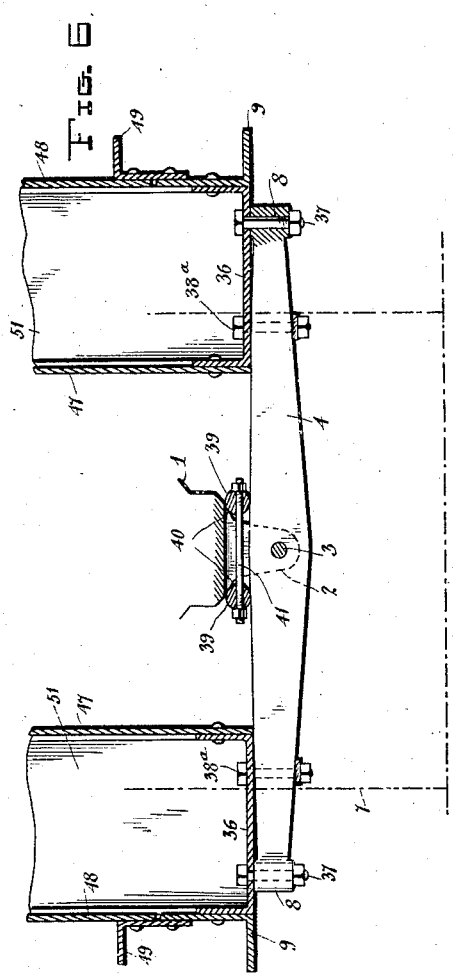
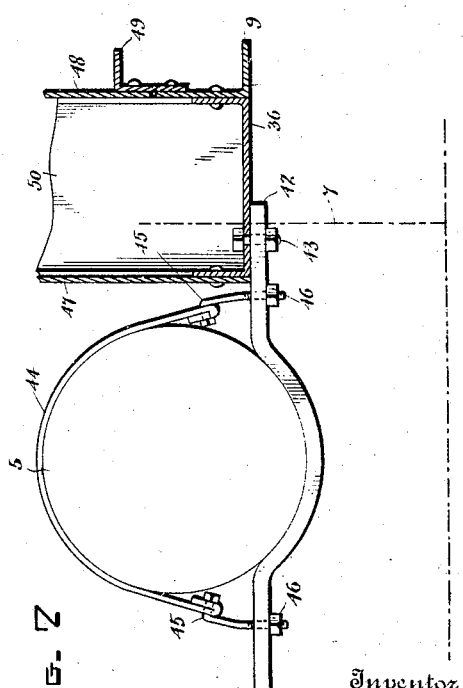
Inventor
Joseph N. Kinney,
By
Attorney Patented July 15, 1930

1,770,784

UNITED STATES PATENT OFFICE

JOSEPH N. KINNEY, OF BROOKLYN, NEW YORK

ATTACHMENT FOR TRACTORS

Application filed May 26, 1927. Serial No. 194,378.

The present invention provides improvements in attachments for tractors whereby a tractor may be converted into a tractor of three-wheel type or into a roller adapted for use in road building, paving and analogous operations, the rolling of lawns and generally for any of the purposes for which rollers are employed, and its tractor function is not impaired, and hence the vehicle provided by the present invention may be adapted to serve the usual purposes of a tractor for the hauling or pushing of any other apparatus, as well as those of a roller.

One of the objects of the invention is to provide a novel and improved frame and means for attaching it to a tractor whereby a tractor of the conventional type may be readily and inexpensively converted into a tractor of larger wheel base and improved riding, steering and traction qualities on rough cross country or soft ground, or into a roller which possesses ample strength and flexibility to fulfil satisfactorily the requirements of a road, lawn or other roller or tractor.

Another object is to provide novel and improved means for mounting the front or steering wheels or roll whereby steering of the vehicle may be accomplished with ease and agility; the steering wheels or roll will accommodate inequalities in the ground or surface to be traversed, with minimum displacement of the frame and without undue strain thereof; and the mounting is capable of withstanding stresses imposed thereon incident to the riding of the steering wheels or roll over curbs or other obstructions.

A further object is to provide novel and improved means for adding cargo compartments to the vehicle, or weight for increase of traction, or weight and reinforcement to the roller structure to suit variable requirements of road building, paving and other rolling operations, receptacles being provided, according to the present embodiment of the invention, by members which strengthen the frame and add their weight thereto, and which form receptacles within the width of the frame adapted to receive cargo or weights.

To these and other ends, the invention consists in certain improvements and combinations and arrangements of parts, all as will be hereinafter more fully described, the features of novelty being pointed out particularly in the claims at the end of this specification.

In the accompanying drawings:—

Fig. 1 is a top plan view of a roller attachment constructed in accordance with the preferred embodiment of the present invention and applied to a tractor of conventional type thus converting the latter into a roller;

Fig. 2 is a side elevation of the roller shown in Fig. 1;

Fig. 3 is a top plan view, on an enlarged scale, of the forward end of the attachment, the latter being shown partly in section, and the steering motions of the front roll being indicated diagrammatically by the full and dotted lines;

Fig. 4 represents a vertical section through the forward end of the attachment, the section being taken on the line 4—4 of Fig. 1 and shown on an enlarged scale;

Fig. 5 represents a partial section on an enlarged scale and taken vertically on the line 5—5 of Fig. 1, the equalizing motion of the front or steering roll being indicated diagrammatically by the full and dotted lines;

Fig. 6 represents on an enlarged scale, a transverse vertical section taken on the line 6—6 of Fig. 1;

Fig. 7 represents on an enlarged scale, a transverse vertical section taken on the line 7—7 of Fig. 1; and Fig. 8 is a collective view showing in perspective the yoke, king pin and bearing forming parts of the front roll mounting.

Similar parts are designated by the same reference characters in the several views.

Attachments embodying the present invention are applicable generally to tractors of various types to convert them into rollers suitable for use in rolling operations of various kinds as well as into vehicles for hauling and pushing operations to which tractors may be applied. The preferred embodiment of the invention is shown in the accompanying drawings and will be hereinafter described in detail, but it is to be understood that the invention is not restricted to the precise construction shown as equivalent constructions are contemplated and such will be included within the scope of the claims.

The invention is shown, in the present instance, as applied to a tractor of a type which is in general use and which is known commercially as the "Fordson" tractor, it comprises the motor 1 the forward end of the crank case of which is provided with a saddle 2 which is pivotally connected by a longitudinally extending bolt 3 to a front axle 4, the rear end of the crank case of the motor being rigidly connected to a gear housing 5 which extends rearwardly and forms a rear axle 6 the axle shafts within which are connected to and function as is well known to drive the rear or traction wheels 7. In applying the attachment of the present invention to a tractor of that type to convert it into a roller, rear or traction wheels are provided the rims of which are sufficiently broad to function as rollers, and the rims of these wheels may be either smooth or provided with cleats or other appropriate appliances, depending upon the use to which the roller is to be applied. The front wheels which in the usual tractor are fitted to the ends of the front axle 4, are omitted or removed by detaching the usual front wheel steering knuckles from the vertical sockets 8 which are formed in the ends of the front axle.

The roller attachment, as shown in the present instance, comprises a rigid frame composed of a pair of longitudinal or side members 9 and a front or cross member 10. The side members of the frame are preferably composed of angle iron one flange of which is arranged vertically and the other flange of which extends horizontally outwardly, and the front member 10 is preferably formed of channel iron the intermediate web of which extends vertically to conform with the height of the vertical flanges of the side members and the flanges of the front member extend forwardly, they serving the purpose of a bumper for the forward end of the roller. The front member 10 is rigidly united to the forward ends of the side members 9 by angle irons 11 which may be bolted or otherwise secured in the corners where these members meet, and the frame may be stiffened by diagonal braces 12 which may be bolted or otherwise secured to the front and side members as shown.

The forward end of the attachment carries wheels which are in the form of a roll 13 which serves to support the forward end of the roller when applied to the tractor and to steer it. This roll is preferably composed of a gang or set of roll sections which are individually of relatively small width so that they may rotate at differential speeds during turning of the roll or during steering of the roller to the right or the left of a straight course. The roll 13 is preferably of a width greater than the distance between the inner edges of the rear wheels 7 of the tractor, as is shown in Fig. 1, in order that it will roll the surface which lies between and is not rolled by the rear wheels.

The roll sections are journalled to revolve freely and individually on a shaft 14, intervening washers 15ª being provided for suitably spacing the roll sections. According to the present invention, the front or steering roll is provided with a gimbal mounting similar to that used in the mounting of gyroscopes, this gimbal mounting providing equalizing motion between the front or steering roll and the frame to compensate for inequalities in the ground or other supporting surface over which the roller travels and also providing for steering motion of the front roll. As shown in the present instance, the ends of the front roll shaft 14 are fixed to the opposite sides of a frame 15, the latter extending preferably in a horizontal plane around the roll 13, it extending diametrically at the sides of the roll and across the front and rear sides thereof, as will be clear from Figs. 1 and 3. The frame 15 is provided, at points midway of the length of the roll 13 and in alinement with the horizontal diameter thereof, with pivots 16, and these pivots rotatably fit into bearings 17 formed in the ends of a yoke 18 which is preferably of substantially semi-circular form and encircles or overlies the upper half of the roll 13. The yoke 18 supports a bearing 20, and one of these parts has a vertical king pin 19 cast or otherwise fixed therein and rotatably fitted into the other part, this pin, in the construction shown, being fixed in the yoke so that it projects upwardly from the top thereof, and is fitted rotatably in the bearing 20 which is fixed to the frame of the attachment.

The front or steering roll and its mounting is contained between the side members 9 of the attachment frame, sufficient clearance being provided for steering and equalizing movements of the roll, and the frame is provided in the present instance with standards 21, preferably in the form of channel irons bolted or otherwise secured to the vertical flanges of the side frame members. To the upper ends of the standards 21 are connected cross members 22 which are also preferably composed of channel irons the webs of which are bolted, riveted or otherwise secured to the outwardly projecting flanges of the uprights 21, the uprights and cross members providing a rigid structure on the frame of the attachment to sustain the king pin bearing 20. This bearing as shown in Figs. 4 and 5 is preferably formed of a casting which is adapted to seat solidly against the lower out-turned flanges of the cross members 22 and is provided with upwardly projecting ribs 23 which are adapted to fit between or against the inner sides of the webs of the cross members 22, and bolts 24 may be fitted into perforations in the lower flanges of the members 22 and in the top of the casting 20 to secure the bearing firmly and solidly to the cross members 22. A retainer plate 25 may be detachably secured by screws or other suitable means to the upper end of the king pin 19 to prevent accidental disengagement of this pin from its bearing. The bearing 20 in cooperation with the king pin 19 provides a fixed vertical axis about which the yoke 18 and the front or steering roll 13 may rotate for steering purposes, and the yoke 18 which is supported by the roll 13, through the medium of the frame 15, supports the front end of the attachment, the lower end of the bearing 20 resting upon the yoke 18. Rotation of the yoke 18 about the king pin as an axis, for steering purposes, is effected by a steering arm 26 which is fixed to the upper portion of the yoke 18 and projects laterally therefrom, the outer end of this steering arm being connected by a suitable universal joint 27 to a steering rod 28 the rear end of which may be operatively connected to an adapter 28ª which may be bolted or otherwise secured to the steering arm 29 of the usual steering mechanism of the tractor, such steering mechanism being controlled by the usual steering wheel 30 which is within reach of the operator occupying the seat 31.

The axis of the king pin 19 is preferably off-set forwardly of the vertical plane passing through the axis of the roll shaft 14, as shown in Fig. 4, this forwardly offset position of the king pin causing the front or steering roll 13 to operate as a caster during the forward motion of the roller. This trailing of the steering roll facilitates steering of the roller while travelling forwardly as the steering roll will tend to remain in any position in which it is set to steer the course of the roller and wabbling of the steering wheel due to back-lash in the steering gear or other causes will be avoided. In order to relieve the king pin of abnormal strain due to the riding of the steering roll over curbing or other obstructions, the forward portion of the yoke 18 is preferably provided with a foot or extension 32 which is integral or rigid with the yoke and overlies the top flange of the front cross member 10. Normally, this foot or extension will stand slightly above the top of the member 10 so that it will not resist rotation of the yoke 18 incident to steering, but should the steering roll encounter an obstruction sufficiently high to deflect the yoke 18 rearwardly, the foot 32 will then descend into contact with the cross member 10 and the stress will then be transferred to a rigid and firm part of the frame so that the frame will sustain the undue stress, thereby relieving the king pin of such stress. After the obstruction has been passed, the foot or extension 32 will return to its normal position above the frame.

By mounting the front or steering roll 13 in the frame 15 which lies in substantially the horizontal plane of the axis of the shaft 14 of this roll and connecting said frame to the yoke 18 by the pivots 16 which are located substantially midway of the length of the roll and substantially in the same horizontal plane with the axis of the roll shaft 14, the front or steering roll is free to oscillate or rock on the shafts 16 as an axis when the roll passes over inequalities in the ground or other surface over which the roller travels, and this equalizing motion of the front or steering roll relieves the frame of the attachment and the remainder of the roller from stress which would otherwise be imposed thereon. The equalizing motion of the steering roll about the pivots 16 is shown diagrammatically in Fig. 5, the full lines in that figure showing the roll in its normal level position and the dotted lines showing the roll tilted or rocked laterally to accommodate itself to inequalities in the surface over which it rides. Moreover, the provision of the frame 15 and yoke 18 and the connecting pivots 16 located as described cause the equalizing motions of the front roll to take place about an axis which is so located that minimum lateral displacement of the forward end of the roller will result from such equalizing motions. For example, when one end of the front roll is raised or lowered, the pivots 16 which are located midway of the height of the roller will be deflected laterally or in a direction axially of the roller a distance equal to one half of the lateral or axial deflection which takes place at the top of the roll, and as these pivots are connected to the roller frame through the medium of the yoke 18, the lateral deflection of the roller frame incident to the equalizing motions of the front steering roll will be thus reduced. This reduction in lateral deflection of the roller frame facilitates steering of the roller, it renders the roller more stable while travelling over rough ground, and when a mowing or other attachment is applied to the front of the roller so as to project forwardly therefrom, this reduction in lateral deflection of the roller frame improves the operation of such attachment as the latter is not subjected to undue lateral deflections as would otherwise occur. Furthermore, the location of the pivots 16 midway of the length of the front roll reduce vertical displacement of the roller frame, due to equalizing motions of the front roll, to one-half of that which would take place if these pivots were located at the top of the roll, and this reduction in vertical displacement of the roller frame contributes to the steadiness of the roller in passing over rough ground, it facilitates steering, and when a mowing or other attachment is arranged in front of the roller, it improves the operation of such attachment as the latter is not subject to undue vertical displacements which would otherwise occur. The angle iron members 11 at the forward end of the roller frame are shown provided with extensions 33 having slots 34 therein to receive a rod or pivot 35 adapted for use in mounting a mower or other attachment at the forward end of the roller.

Any suitable cross-member may be employed for supporting the forward portion of the tractor on the roller frame. In the present instance the usual front axle 4 of the tractor is utilized for this purpose, and a pair of angle members 36, preferably of channel form with the flanges thereof upturned, are arranged at the inner sides of the longitudinal or side frame members 9, the outer upturned flanges of these channel members being riveted or otherwise secured to the upturned or vertical flanges of the respective members 9 as will be clear from Fig. 6. The outer ends of the front axle 4 or other cross-member are adapted to extend beneath the under sides of these channel members, the ends of the axle, as shown, being rigidly secured thereto by bolts 37 which extend through the bottoms of the channel members and through the sockets 8 in the ends of the axle from which the usual front wheel steering knuckles have been removed. Additional bolts 38ª may also be provided, as shown, for securing the axle or cross member to the members 36. The axle or other cross-member may thus be supported by suspension from the side members of the frame. The front end of the tractor may be supported in the middle of the axle 4 or other cross-member through the medium of the usual pivot bolt 3, but it is generally preferable to unite the attachment rigidly to the tractor. For this purpose, a pair of wedges 39 are provided in the present instance, these wedges resting on the top of the axle or cross-member 4 and bearing against the inclined or bevelled surfaces 40 at the opposite sides of the saddle 2, a bolt 41 connecting the wedges and operating when tightened, to draw the wedges toward one another and hence to force them into positions between the top of the axle or cross-member 4 and the respective bevels on the saddle at opposite sides of the bolt 3, the wedges when thus adjusted, serving to prevent relative pivoting movements between the tractor and the axle or cross-member, about the pivot or bolt 3. The rear end of the attachment is suitably secured to and supported from the tractor by one or more suitable cross-members, the cross-member 42 shown in the present instance comprising a bar having its intermediate portion curved to fit against the under side of the approximately cylindrical gear case 5 of the tractor and the ends of this bar extend beneath the channel members 36 and are secured rigidly thereto by bolts 43 or other suitable means. The cross-member 42 is rigidly fixed to the tractor by a strap 44 which extends around the upper side of the gear case 5 of the tractor, the ends of this strap being attached to hooks 45 the terminals of which extend downwardly through openings in the cross bar 42 and are provided with nuts 46 by means of which the strap may be tightened. The cross bar is thus bound firmly and rigidly to the body of the tractor so that the cross bar may serve as a rigid support for the rear portion of the attachment.

In some instances such for example as in road building or paving operations, it may be desirable to increase the weight of the roller. The present invention provides for this purpose weight receiving-receptacles which are accommodated between the sides or within the width of the frame of the attachment. Preferably and as shown, metal plates 47 are riveted or otherwise secured to the inner sides of the inner vertical flanges of the longitudinal channel members 36, these plates being of sufficient height and length to conform with the dimensions of the weight receptacles desired, and outer plates 48 extending to the same height as the plates 47 are placed edgewise to the tops of the vertical flanges of the side frame members 9 and are united therewith by channel irons 49 which are riveted or otherwise secured at the outer sides of the frame so as to lap the joint thus formed. The front and rear ends of the receptacles are closed by channel members 50 the flanges of which are riveted or otherwise secured in place between the longitudinal side plates 47 and 48, and if desired, intermediate partitions 51, also preferably of channel iron, are riveted or otherwise secured in position between the longitudinal side plates 47 and 48. The weight receptacles thus provided are accommodated within the sides of the frame so that they do not constitute lateral projections from the roller which would be objectionable, and the weight of the structure composing these receptacles, and the weights or weighting material placed in these receptacles enables the weight of the roller to be increased as may be desired. The weight receptacles are preferably located about midway of the length of the roller, as will be clear from Figs. 1 and 2, so that when the weight of the roller is increased in the manner hereinbefore described, the increased weight will be distributed to the rolls or wheels approximately in proportion to the widths of their rims or faces.

The roller or vehicle attachment may, as shown by the drawings, be constructed largely of commercial forms, thus facilitating its manufacture and reducing its cost, and when applied to a tractor it is rigidly secured to it and becomes a unit therewith, the rigidity of the tractor and attachment thus combined insuring stability of the roller or vehicle, especially when travelling over rough or uneven ground. Such stability is particularly advantageous when the tractor is converted into a roller to be employed in conjunction with a lawn mower or other apparatus attached to the front thereof, as the roller, when used in conjunction with a lawn mower, performs the dual function of propelling the mower and rolling the lawn.

While the roller or vehicle attachment is herein shown and described as applied to a tractor of one well known and generally used type, it is to be understood that the invention is not so limited, as the attachment may be readily adapted for application to tractors other than the particular type shown. Also, it will be understood that when the attachment is used to convert a tractor into a vehicle other than a roller, the front or steering wheels may be of forms other than the roll herein shown, to suit the uses to which such vehicle is to be applied.

The attachment, it will be observed, is applied to the front and sides only of the tractor, and hence the usual hitch 6ª at the rear of the tractor is not obstructed or otherwise interfered with but may be employed as usual for towing, hauling and similar purposes.

I claim as my invention:—

1. In a vehicle of the class described, the combination of a main frame embodying a front member, side members, uprights rigidly connected to said side members and extending upwardly therefrom, a cross member connecting said uprights, and a bearing carried by said cross member, a steering wheel or roll arranged in rear of said front member and between the side members and uprights and below said cross member of the frame and having a shaft, and a mounting for the wheel or roll comprising a yoke which straddles the upper side of the wheel or roll and has its ends extended downwardly at the front and rear thereof, said yoke having a projection engageable with said front member, the upper intermediate portion of the yoke engaging said bearing for steering movements about a vertical axis, and a frame supported on said shaft and having portions thereof in front and rear of the wheel or roll which support the respective ends of the yoke.

2. In a vehicle of the class described, a main frame, a horizontally and vertically pivoted steering wheel carried by a portion of said frame and capable of deflection in a direction normally to its horizontal and vertical pivotal axes, means normally disengaged from but capable of bearing on a portion of the main frame for limiting deflection of said steering wheel in a direction normally to its said pivotal axes, and means for connecting portions of said frame to a tractor.

3. A vehicle comprising a main wheeled frame, a supplemental frame containing a roll or wheel, and a steering yoke pivoted vertically to said main frame and horizontally to said supplemental frame, said yoke being capable of deflection in a direction normally to its pivotal axes and having a projection adjacent to a horizontal portion of the main wheeled frame, said projection bearing on said horizontal portion when said yoke is deflected in a direction normally to its pivotal axes.

4. In a vehicle of the class described, the combination of a frame having a vertical bearing supported thereon, a steering wheel or roll arranged within the frame, means including a yoke extending forwardly and rearwardly over said wheel or roll and having a vertical king pin engaging in said bearing for mounting said wheel or roll in the frame for steering movements, the frame having a portion thereof extending forwardly beyond the steering wheel or roll and having a cross member extending transversely of the frame and horizontally in front of said wheel or roll, and a member projecting forwardly from the forward end of the yoke and movable in an arcuate path which overlies said cross member of the frame during the steering movements of the yoke about the axis of the king pin.

5. The combination of a tractor having laterally-spaced rear driving wheels, and an attachment therefor comprising a frame having longitudinal side members provided with means for supporting them at the respective sides of the tractor and in front of the driving wheels thereof, a steering roll mounted opposite to the space between the rear driving wheels and supporting the forward portion of said frame, and weight receptacles on the frame located between the side members thereof and substantially in line centrally with the tread of said roll and the rear driving wheels respectively and substantially equidistant longitudinally between the steering roll and the respective rear driving wheels.

In testimony whereof I have hereunto set my hand.

JOSEPH N. KINNEY.